United States Patent
Heirich et al.

(10) Patent No.: US 6,516,032 B1
(45) Date of Patent: Feb. 4, 2003

(54) FIRST-ORDER DIFFERENCE COMPRESSION FOR INTERLEAVED IMAGE DATA IN A HIGH-SPEED IMAGE COMPOSITOR

(75) Inventors: Alan Heirich, Half Moon Bay; Pankaj Mehra, San Jose; Robert W. Horst, Saratoga, all of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/264,348

(22) Filed: Mar. 8, 1999

(51) Int. Cl.$^7$ ................................................. H04B 1/66
(52) U.S. Cl. ............................... 375/240.17; 375/240.18
(58) Field of Search ................................ 382/236, 238, 382/232, 253; 375/240.17, 240.18; 360/32; H04B 1/66

(56) References Cited

U.S. PATENT DOCUMENTS

| | | |
|---|---|---|
| 4,827,445 A | 5/1989 | Fuchs |
| 4,949,280 A | 8/1990 | Littlefield |
| 5,264,837 A | 11/1993 | Buehler |
| 5,276,798 A | 1/1994 | Peaslee et al. |
| 5,337,410 A | 8/1994 | Appel |
| 5,394,524 A | 2/1995 | DiNicola et al. |
| 5,481,669 A | 1/1996 | Poulton et al. |
| 5,546,530 A | 8/1996 | Grimaud et al. |
| 5,554,530 A | 9/1996 | Fortin et al. |
| 5,557,479 A * | 9/1996 | Yanagihara ................. 360/121 |
| 5,557,711 A | 9/1996 | Malzbender |
| 5,583,500 A * | 12/1996 | Allen et al. .................. 341/107 |
| 5,583,974 A | 12/1996 | Winner et al. |
| 5,621,465 A * | 4/1997 | Kondo ........................ 348/395 |
| 5,761,401 A | 6/1998 | Kobayashi et al. |
| 5,841,444 A | 11/1998 | Mun et al. |
| 5,990,904 A | 11/1999 | Griffin |
| 6,002,794 A * | 12/1999 | Bonneau et al. ............. 382/166 |
| 6,052,126 A * | 4/2000 | Sakuraba et al. ............ 345/430 |
| 6,222,937 B1 | 4/2001 | Cohen et al. |
| 6,292,194 B1 | 9/2001 | Powell, III |

OTHER PUBLICATIONS

Molnar, S., "Combining Z–buffer Engines for Higher–Speed Rendering," Advances in Computer Graphics Hardware III (Proceedings of Eurographics Workshop on Graphics Hardware), Eurographics Seminars, pp. 171–182, 1998.

Eyles, et al., "PixelFlow: The Realization," Proceedings of the 1997 Siggraph/Eurographics Workshop on Graphics Hardware, Los Angeles, CA, Aug. 3–4, 1997, pp. 57–68.

Molnar, et al., "PixelFlow: High–Speed Rendering Using Image Composition," Siggraph '92 Proceedings, vol. 26, No. 2, pp. 231–240, Jul. 1992.

Molnar, S., "Image–Composition Architectures for Real–Time Image Generation," UNC–CS Technical Report, TR91–046, 1991.

Torberg, John G., "A Parallel Processor Architecture for Graphics Arithmetic Operations", Computer Graphics, vol. 21, No. 4, pp. 197–204, Jul. 1987.

* cited by examiner

*Primary Examiner*—Chris Kelley
*Assistant Examiner*—Behrooz Senfi
(74) *Attorney, Agent, or Firm*—Oppenheimer, Wolff & Donnelly, LLP; Leah Sherry

(57) ABSTRACT

An encoder accepts an N byte set of values for each of a plurality of image components, with N being greater than one and, for each N byte set of values, identifies a compressed symbol length, K, wherein K is the smallest integer such that the difference between any two adjacent bytes is expressible in K bits or less, outputs an indication of K and outputs a K bit difference between the byte and an immediately prior byte, for each byte in the set.

12 Claims, 4 Drawing Sheets

FIRST-ORDER DIFFERENCE COMPRESSION FOR INTERLEAVED IMAGE DATA IN A HIGH-SPEED IMAGE COMPOSITOR

BACKGROUND OF THE INVENTION

The present invention relates to compression in general and in particular to compression for high-speed pixel data transport.

Real-time image generation at high resolutions generally requires fast, dedicated hardware for generating images (pixel color value arrays) from a geometric model. One problem with some image generators is that pixel data must be moved around quickly, so that the transport of data does not slow the entire operation. For example, if a real-time NTSC video image is being generated at a resolution of 640 pixels by 480 pixels at 30 frames/second, one second of video contains 9,216,000 pixels. Each of those pixels might be represented by 40 to 68 bits, eight bits for each of the red, green and blue components, 16 to 32 bits for Z depth and possibly eight to twelve bits for "alpha" data (the alpha factor relates to transparency). The Z depth and alpha data often need to accompany a pixel so that the pixel can be processed in ways that might depend on the Z and alpha values for the pixel. For example, if two pixel values associated with the same screen location but two different objects are being considered to determine which object is visible at the location of the pixel, the Z value from the two pixel values is needed. If one of the objects is semitransparent, the alpha value for that object at that pixel location might be needed to calculate the pixel color value at that location.

With just 40 bits of information for each pixel, one second of video would require about 36 million bits; with 68 bits, the requirement is about 63 million bits. For real-time transport of the video, a channel bandwidth of about 36 to 63 mbs (million bits per second) is needed. It is well known to compress video data to reduce the size of the channel needed, especially since large areas of a video frame (such as background) might remain the same from frame to frame. One common standard for video compression is known as the MPEG (Motion Pictures Experts Group) standard. Good compression can be obtained with MPEG, but not if latency is taken into account.

Latency in an image generator is the time delay between the time the image generator receives a geometric model and the time the image generator outputs an image. A geometric model mathematically defines the objects that are present in a virtual "world space". From that geometric model and a description of a view point and a view surface, the image generator generates an image that would be the view on the view surface from the view point, if the world space and the modeled objects actually existed. A real-time image generator might be used, for example, in a flight simulator. A flight simulator might operate by accepting input from sensors and a "pilot" and then display the resulting image that would be seen if the pilot was actually flying an airplane. If the latency between when the image generator receives the information about scene changes and a new image is generated is too long, the pilot will experience "sea sickness" since the video image will be too far out of sync with the pilot's other stimuli.

A typical real-time video application might require an overall latency of 100 milliseconds (ms) or less. If the actual image processing takes up, for example, 60 ms of that allotted time, it would not be helpful to use compression to more quickly move the data around if the compression process has a latency of much more than 40 ms. Therefore, if compression is to be used in an image generator to more fully use a limited bandwidth, the latency added due to the compression must be minimized.

SUMMARY OF THE INVENTION

The present invention overcomes several disadvantages of the prior art methods and apparatus for generating images.

In one method according to the present invention, an encoder accepts an N byte set of values for each of a plurality of image components, with N being greater than one and, for each N byte set of values, identifies a compressed symbol length, K, wherein K is the smallest integer such that the difference between any two adjacent bytes is expressible in K bits or less, outputs an indication of K and outputs a K bit difference between the byte and an immediately prior byte, for each byte in the set.

A further understanding of the nature and advantages of the inventions herein may be realized by reference to the remaining portions of the specification and the attached drawings.

DESCRIPTION OF THE PREFERRED EMBODIMENTS

The present invention has many applications, as will be apparent after reading this disclosure. In describing an embodiment of a data encoder and decoder according to the present invention, only a few of the possible variations are described. Other applications and variations will be apparent to one of ordinary skill in the art, so the invention should not be construed as narrowly as the examples, but rather in accordance with the appended claims.

Figure 1:
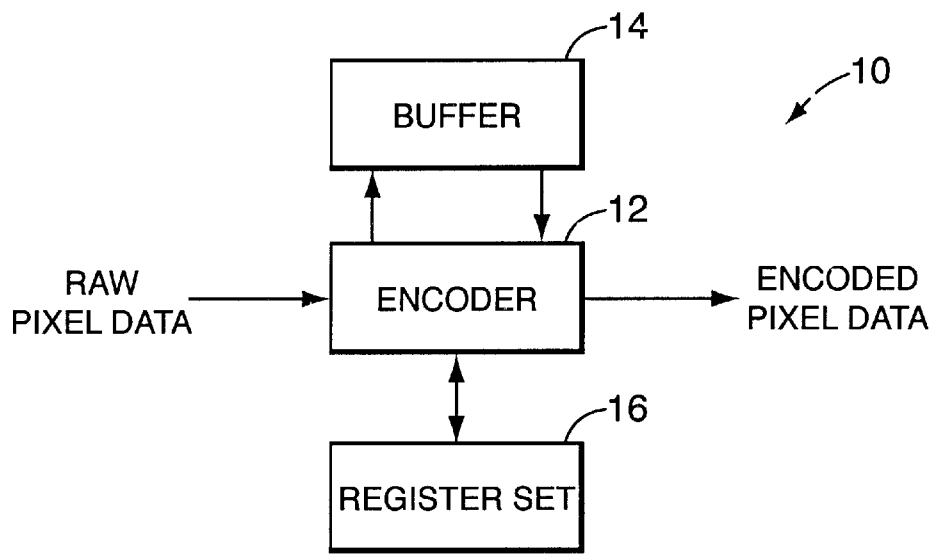
FIG. 1 is a block diagram of an encoder according to one embodiment of the present invention.
Figure 2:
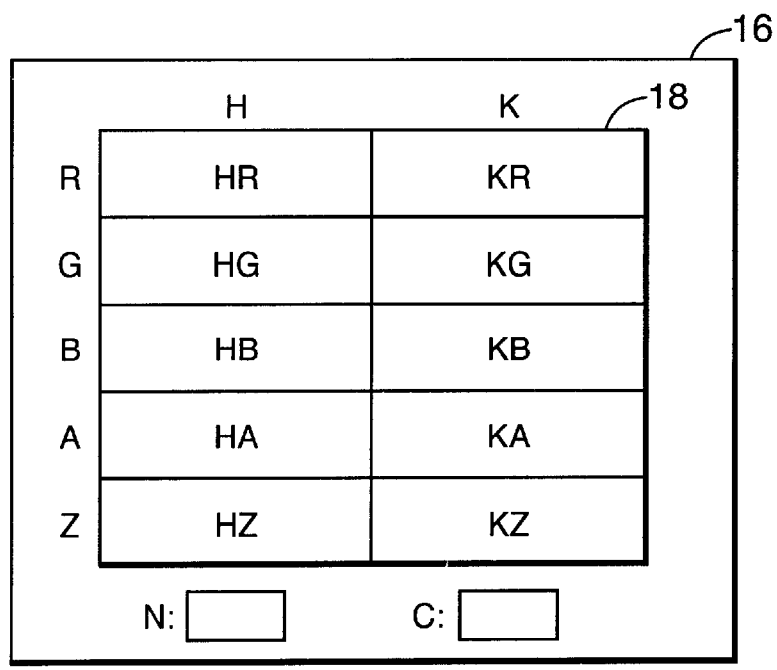
FIG. 2 is a block diagram of a register set used by the encoder of FIG. 1.

FIG. 1 is a block diagram of an encoder system 10 comprising an encoder 12, a buffer 14 and a register set 16. As shown, encoder 12 has an input for receiving raw pixel data and an output for encoded pixel data. Connections are provided between encoder 12 and buffer 14 to allow for the storage and retrieval of raw pixel data received at the input to encoder 12. Connections are also provided between encoder 12 and register set 16 to allow for reading and writing values to registers in register set 16. One possible layout of register set 16 is shown in FIG. 2 and described in detail below.

For encoder system 10, the raw pixel data comprises packets where each packet contains values describing one pixel. The pixel may be fully processed pixel in an output image and can be specified by just the color value(s) for that pixel. However, more commonly, the pixel is in the process of being evaluated and the pixel data needs to include more information about the pixel. One instance of this is where a parallel image generator is used and each parallel stage of the image generator generates a pixel (i.e., a set of pixel color values) taking into account less than all of the objects that intersect a ray through that pixel's screen location.

For example, one parallel stage might determine that the object visible at that pixel's screen location is a blue object, being unaware of a red object that another parallel stage (unaware of the blue object) has determined is visible at the pixel's screen location. When the output of these parallel stages get combined, a merge engine, or similar element, considers the blue value provided by one stage and the red value provided by the other stage to determine which of the two objects is the object that is actually "visible" from the view point for which the image is being generated. In order to make this determination, the merge engine would need to know which object is closer (at that pixel location) to the view point. Typically, this is accomplished by including a depth value (usually represented by the variable "Z") with the pixel color values from each stage. By one convention, higher Z values represent objects closer to the view point, and by another convention, lower Z values represent objects closer to the view point. Herein, the former convention is used.

The merge engine can determine the final color value for a pixel from just the color and Z values for several object surfaces at that pixel screen location, if the objects are opaque, since the final color value is equal to the color value of the closest object. Pixel merging is more complex where the objects (at least the closer objects) are not opaque, as might be the case where the geometric model being rendered is an automobile with a partially transparent windshield. In those cases, the merge engine needs a transparency value in addition to the color and Z values in order to determine the final pixel color value. By convention, the transparency value is represented by the variable "α", which is referred to herein as the "alpha value" or represented by "A".

In view of the above, it is assumed herein that pixel data includes a color, a Z value and an alpha value, although it should be understood that the principles and apparatus described herein will work equally well in a system where no objects are transparent or the alpha value is not otherwise used, or where the Z value is not needed. The compression methods described below assume that each of the component channels that are used are compressed, however those methods will also work with some channels being compressed and others not being compressed. One method of representing a pixel's color value is to specify a red component, a green component and a blue component. That is the method used here, and the pixel data for a pixel is expressed as a set of values (R, G, B, A and Z).

The range of values for each of the components of pixel data depends on the application, but some selections are common. For example, a set of ranges might provide for an eight-bit range (integers from 0 to 255) for each of the red, green and blue components, 16, 24 or 32 bit ranges for the Z value and an eight-bit range for the alpha value. With such ranges, the raw pixel data packet size is between 5 bytes (16-bit Z values, no alpha values) and 8 bytes (32-bit Z values, 8-bit alpha values), which is 40 to 64 bits per pixel. The size increases if the alpha value is split into subcomponents to specify the transmissivity of an object at the red, green and blue wavelengths. The following examples and explanations of operation assume that a pixel is represented by 40 bits: 8 for R, G, B and A and 16 for Z.

Referring now to FIG. 2, the details of register set 16 are shown. Register set 16 includes a register for a value N representing the number of pixel packets to be encoded together, and a register for a value C representing the number of pixel packets received by encoder 12. Register set 16 also includes a register array 18 that provides an H (history) register and a K register for each of the red (R), green (G), blue (B), alpha (A) and Z depth (Z) components, denoted KR, KG, KB, KA, KZ, HR, HG, HB, HA and HZ, respectively. In some embodiments, N might be fixed and no register would be needed. In experiments, a value of N=4 was found to yield good compression.

Figure 3:
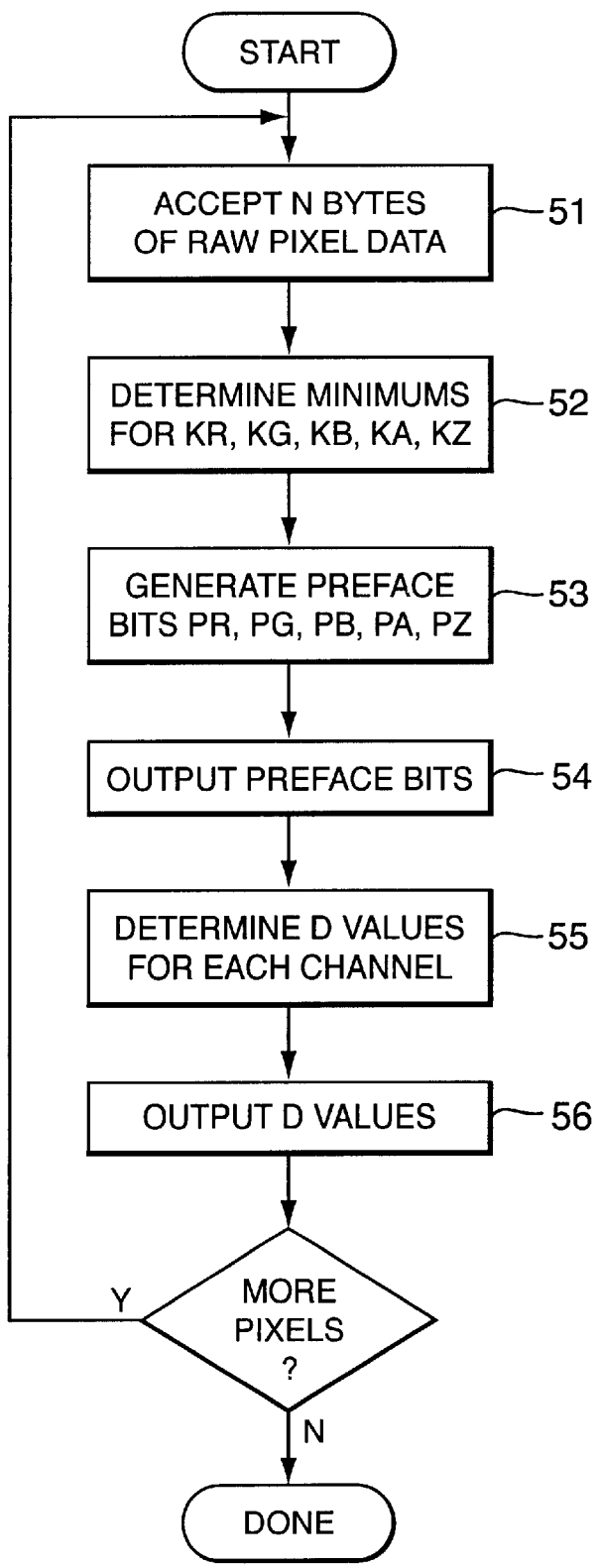
FIG. 3 is a flowchart of a process for encoding pixel data according to one embodiment of the present invention.

The operation of encoder 12 and the encoding process will now be described, with reference to FIGS. 1–3. References to specific steps shown in the flowchart of FIG. 3 are indicated in the text parenthetically.

The encoding process takes advantage of the nature of the pixel data. In much of the pixel data, the various components might be expected to behave independently, so the components are compressed separately. In many images, adjacent pixels share a common, or close to common, color and this is considered in the compression. The raw pixel data is compressed by considering blocks of N pixel packets (R, G, B, A, Z). For each block, a minimum difference value length, K, is determined for each component and stored in the K registers. In calculating K, the component values for the last pixel of the immediately prior block are used; those component values are stored in the H registers.

K is the minimum number of bits needed to convey the difference between one pixel component value and an immediately prior pixel value for the same component. To simplify the process, the 16-bit Z values can be represented as two 8-bit values (Z1, Z2), so that eight is the maximum value for K. Once the lengths K are found for each component, those lengths form part of the encoded block to be output by encoder 12. The differences from pixel to pixel, which can be expressed in K bits, also form part of the encoded block. If K is eight or less, K can be represented in the encoded block with three bits. For a fixed N, the compression rate for a component of a block is $8N/(3+NK)$.

To begin an encoding process, encoder 12 receives 40-bit packets of raw pixel data from its input and stores those packets in buffer 14 until N packets are received (step S1). As each packet is received, encoder 12 increments C until C=N. Once N packets are received, encoder 12 can and does determine the value of K for each component (step S2). The value for KR is determined by identifying the largest difference between adjacent R components and KR is the smallest value such that $2^{KR}$ is equal to or greater than that largest difference. The first difference is between the first R component and the R component of the last pixel in the immediately prior block, which is stored in register HR. Where the differences are two's-complement numbers, then K can be more generally described as the smallest integer such that the differences can be expressed in K bits. The values for KG, KB, KA and KZ are similarly determined.

Once the lengths K are found for each component, preface bits are generated for the pixel block (S3). The preface bits P (PR, PG, PB, PA and PZ) are a function of K, and in one embodiment, the relationship of P and K is as shown in Table 1.

TABLE 1

| P | K |
|---|---|
| 0 | 0 |
| 1 | 2 |
| 2 | 3 |
| 3 | 4 |
| 4 | 5 |
| 5 | 6 |
| 6 | 7 |
| 7 | 8 |

P=0 is used to indicate that the values of a component are the same for all N pixels in the block and for the last pixel of the immediately prior block (which can be found in the corresponding H register). Because the values are constant and are the same as a value from a prior block, the decoder can decode those values without any further information, and therefore K can be zero and no differences need be sent. Note that when P=7 (K=8), there is no compression because the largest difference requires all eight bits and an additional 3 preface bits are included in the encoded pixel data.

The preface bits are output in step S4, but in some embodiments, the preface bits might be sent in a different order or buffered at the output of the encoder, or some other variation of ordering. The difference values D are also calculated for each pixel and channel (S5) and then output (S6). Of course, if K=0, then no differences need to be output. Preferably, the preface bits for a component channel are sent prior to the difference bits for that component channel, so that the decoder can easily determine how many bits need to be accepted at its input for the difference values.

The encoding process is also illustrated in Tables 2 and 3, for the case where N=4. Table 2 shows one possible structure of the contents of buffer 24 for an encoding process and Table 3 shows one possible structure for an encoded pixel data block output by encoder 12.

TABLE 2

| R1, G1, B1, A1, Z1 |
|---|
| R2, G2, B2, A2, Z2 |
| R3, G3, B3, A3, Z3 |
| R4, G4, B4, A4, Z4 |

TABLE 3

| PR, DR1, DR2, DR3, DR4 |
|---|
| PG, DG1, DG2, DG3, DG4 |
| PB, DB1, DB2, DB3, DB4 |
| PA, DA1, DA2, DA3, DA4 |
| PZ, DZ1, DZ2, DZ3, DZ4 |

In Table 2, R1 refers to the red component value of the first pixel, R2 refers to the red component value of the second pixel, G1 refers to the green component value of the first pixel, and so on. In Table 3, DR1 refers to the difference between the red component value of the first pixel and the red component value of the last pixel in the immediately prior block (that value is stored in register HR), DR2 refers to the difference between the red component value of the second pixel and the red component value of the first pixel, DG1 refers to the difference between the green component value in the first pixel and the green component value of the last pixel in the immediately prior block (that value is stored in register HG), and so on. The difference values in any one row of Table 3 all have the same bit length, which can be determined by inspection of the value of the preface bits for that row.

Once an encoded pixel block, such as the example shown in Table 3, is output by encoder 12, the encoder checks for further input raw pixel data and processes that new data if available. As should be apparent from the above description, blocks of pixel data can be quickly encoded for data compression, compressing each component separately to take advantage of images where some components might vary more than others and to take advantage of other characteristics of the process, all while preserving the low latency required by such a system.

The latency of the encoding process is equal to the time needed to receive N−1 pixels and the time to process the raw pixel data to derive the preface bits and the differences. With suitable logic, some of the processing can begin even before all N pixels arrive at the encoder to respond quickly after receipt of the N-th pixel.

Figure 4:
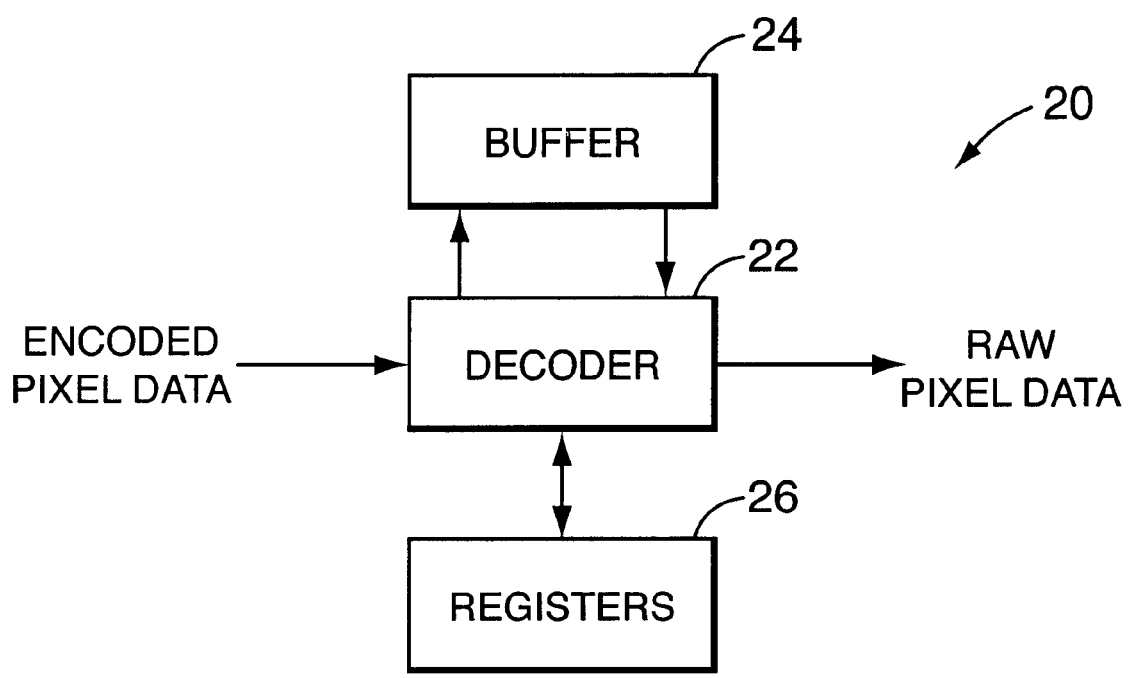
FIG. 4 is a block diagram of an encoder according to one embodiment of the present invention.

FIG. 4 is a block diagram of a decoder system 20 that performs the inverse of encoder system 10. As shown, decoder system 20 comprises a decoder 22, a buffer 24 and a register set 26 and decoder 22 has an input for receiving encoded pixel data and an output for outputting raw pixel data, substantially in the form originally received by a corresponding encoder. Connections are provided between decoder 22 and buffer 24 to allow for the storage and retrieval of encoded pixel data received at the input to decoder 22 and of the raw pixel data being decoded. Connections are also provided between decoder 22 and register set 26 to allow for reading and writing values to registers in register set 26. Register set 26 has substantially the same structure as register set 16 shown in FIG. 2. Register set 26 need not be identical, however. For example, register set 26 might not need the C or N registers. Of course, it should be understood that the contents of register set 26 (and register set 16) could be implemented as memory variables within decoder 22 (and encoder 12).

The decoding process uses the data provided in an encoded pixel data block (see Table 3 for an example) and data stored in the H registers of register set 26 to generate a raw pixel data block (see Table 2 for an example). Since the preface bits (PR, PG, PB, PA, PZ) preferably arrive at decoder 22 before the difference value bits, the decoder can determine the values of K for each component channel. The values of K are stored in the K registers of register set 26 and used to determine how many bits were used to make up the difference values. The values for the components of the first pixel in a block are determined by adding the first set of differences to the values in the H registers. The values for the components of the second pixel in a block are determined by adding the second set of differences to the values of the first pixel, or by adding the second set of differences to the values of the H registers, if the H registers are updated after each set of pixel values is determined. The latter method has the advantage that the H registers would be already set up for the next block, since they would contain the values for the components of the last pixel in the block.

If decoder 22 encounters a channel with P=0, no bits are expected for that channel's component for that block and no bits are read in. Instead the value of the H register for that component is used N times. In order for decoding to work properly for the first pixel block, the H registers need to be valid at the outset. This can be done by handshaking between the encoder and the decoder or by using predetermined initialization values. A more simple method might be to fix KR=KG=KB=KA=KZ=8 for the first block transmitted, so that the decoder does not need to rely on the values of the H registers. Of course, if Z is 16 bits, then KZ=16 for the first block, or the Z channel is split into two byte channels. The latter approach is preferred, because then all prefaces can fit into three bits. If the former approach is used, then the prefaces for the Z channel are extended to four bits, and the values for K could range from 0 to 16. The conversion between K values and P values would be the same as in Table 1, with K=P+1 for values of P between 8 and 15.

Figure 5:
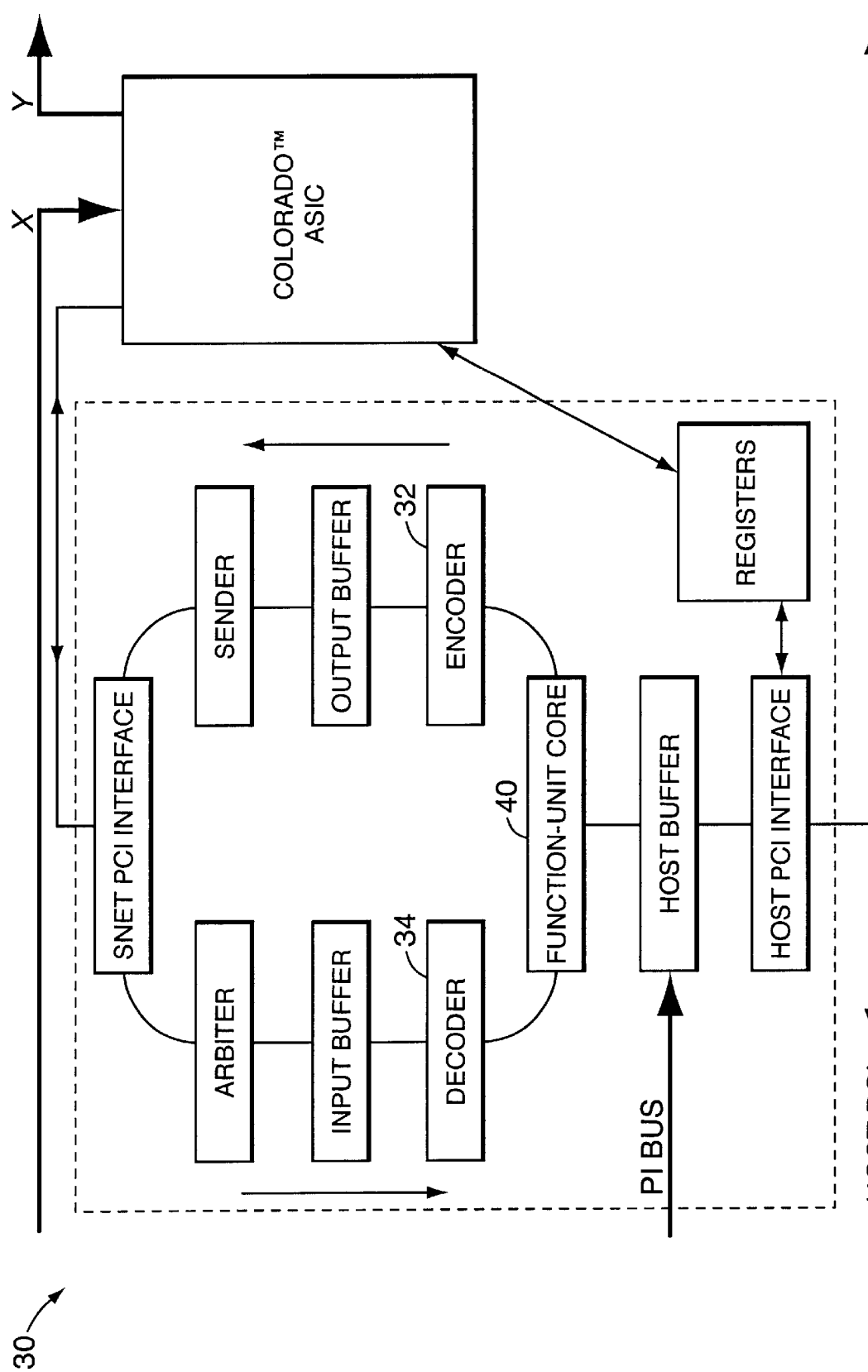
FIG. 5 is a block diagram of a merge engine for use in a parallel image generator where the merge engine includes a decoder and an encoder for compressing and decompressing data passed between merge engines in the parallel image generator.

FIG. 5 is a block diagram of a merge engine 30 incorporating an encoder 32 and a decoder 34. Encoder 32 encodes data outbound from merge engine 30 (to be received by a decoder 34 in another merge engine) and decoder 34 decodes data inbound to merge engine 30. In some cases, where a component such as a core 40 operates on pixel components separately, the components could be supplied by decoder as they are received. For example, if core 40 is performing a pixel compare, it might first receive the Z components for two pixels if those are ready before the color values are ready, so that core 40 can set up to quickly evaluate the pixel color values when they arrive. The Z components are separated into two channels (Z1, Z2), the core 40 could receive the high-order channel (Z1) and if the Z1 value is different for the two pixels being compared, core 40 need not wait for the Z2 values before proceeding with a comparison.

In a variation of the above-described compression system and method, the value of K could be a predetermined value that is kept constant over the entire system. With K constant and predetermined, just the difference bits can be sent, without the preface bits. N can be variable or fixed. Where there is a need to send extra information, such as to indicate a value of N or a special condition such as a repetition of a byte or nibble, that special information is encoded by using reserved values for the difference values. In some cases, one of the reserved values might indicate that the data following the reserved value is uncompressed or compressed data.

The above description is illustrative and not restrictive. Many variations of the invention will become apparent to those of skill in the art upon review of this disclosure. For example, the basic unit for values is a byte, but the teachings of the above description can be modified for larger or smaller units. The scope of the invention should, therefore, be determined not with reference to the above description, but instead should be determined with reference to the appended claims along with their full scope of equivalents.

What is claimed is:

1. A method of compressing data for transmission over a channel between two components in an image compositor, the method comprising the steps of:
    accepting an N byte set of values for each of a plurality of image components, with N being greater than one;
    for each N byte set of values, performing the steps of:
    1) identifying a compressed symbol length, K, wherein K is the smallest integer such that the difference between any two adjacent bytes is expressible in K bits or less;
    2) outputting an indication of K;
    3) for each byte of the set, outputting a K bit difference between the byte and an immediately prior byte.

2. The method of claim 1, wherein the immediately prior byte for the output of a first byte is a predetermined value or a value being a predetermined function of a byte from a prior N byte set.

3. The method of claim 1, wherein the plurality of image components comprises red, green, blue, transparency and depth components.

4. The method of claim 1, wherein the step of outputting an indication of K is a step of outputting a 3-bit preface value, wherein a value of zero indicates N bytes of a constant value and all other values indicate a value of K one more than the preface value.

5. An apparatus for compressing data for transmission over a channel between two components in an image compositor, the apparatus being operative to:
    accept an N byte set of values for each of a plurality of image components, with N being greater than one;
    for each N byte set of values, performing the steps of
    1) identifying a compressed symbol length, K, wherein K is the smallest integer such that the difference between any two adjacent bytes is expressible in K bits or less;
    2) outputting an indication of K;
    3) for each byte of the set, outputting a K bit difference between the byte and an immediately prior byte.

6. The apparatus of claim 5, wherein the immediately prior byte for the output of a first byte is a predetermined value or a value being a predetermined function of a byte from a prior N byte set.

7. The apparatus of claim 5, wherein the plurality of image components comprises red, green, blue, transparency and depth components.

8. The apparatus of claim 5, wherein the step of outputting an indication of K is a step of outputting a 3-bit preface value, wherein a value of zero indicates N bytes of a constant value and all other values indicate a value of K one more than the preface value.

9. An apparatus for compressing data for transmission over a channel between two components in an image compositor, comprising:
    means for accepting an N byte set of values for each of a plurality of image components, with N being greater than one;
    means for identifying a compressed symbol length, K, for each N byte set of values, wherein K is the smallest integer such that the difference between any two adjacent bytes is expressible in K bits or less;
    means for outputting an indication of K for each N byte set of values; and
    means for outputting a K bit difference between the byte and an immediately prior byte for each byte of each N byte set of values set.

10. The apparatus of claim 9, wherein the immediately prior byte for the output of a first byte is a predetermined value or a value being a predetermined function of a byte from a prior N byte set.

11. The apparatus of claim 9, wherein the plurality of image components comprises red, green, blue, transparency and depth components.

12. The apparatus of claim 9, wherein the means for outputting an indication of K is a means for outputting a 3-bit preface value, wherein a value of zero indicates N bytes of a constant value and all other values indicate a value of K one more than the preface value.

* * * * *